(12) United States Patent
Malkireddy et al.

(10) Patent No.: US 12,572,578 B2
(45) Date of Patent: *Mar. 10, 2026

(54) CONTENT COLLABORATION PLATFORM WITH DYNAMICALLY-POPULATED TABLES

(71) Applicant: Atlassian Pty Ltd., Sydney (AU)

(72) Inventors: Siddharth Reddy Malkireddy, San Jose, CA (US); Sami Nudelman, Austin, TX (US); Divya Sriram, San Francisco, CA (US); Matthew Alexander Machuca, Redwood City, CA (US); Abhinav Singh, Seattle, WA (US); Michael Oates, Sydney (AU); Matthew Peter Dellandrea, Bellevue, WA (US)

(73) Assignee: ATLASSIAN PTY LTD., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 19/019,358

(22) Filed: Jan. 13, 2025

(65) Prior Publication Data

US 2025/0217398 A1 Jul. 3, 2025

Related U.S. Application Data

(63) Continuation of application No. 18/399,605, filed on Dec. 28, 2023, now Pat. No. 12,197,480.

(51) Int. Cl.
| | |
|---|---|
| *G06F 16/38* | (2019.01) |
| *G06F 3/0482* | (2013.01) |
| *G06F 16/335* | (2019.01) |
| *G06F 16/338* | (2019.01) |

(52) U.S. Cl.
CPC .......... *G06F 16/335* (2019.01); *G06F 3/0482* (2013.01); *G06F 16/338* (2019.01); *G06F 16/38* (2019.01)

(58) Field of Classification Search
CPC ...... G06F 16/335; G06F 16/38; G06F 16/338; G06F 3/0482
See application file for complete search history.

(56) References Cited

U.S. PATENT DOCUMENTS

| | | | |
|---|---|---|---|
| 2009/0094538 A1* | 4/2009 | Ringler ................. | G06F 40/177 715/810 |
| 2011/0270815 A1* | 11/2011 | Li ..................... | G06F 16/24522 707/706 |

* cited by examiner

*Primary Examiner* — Jared M Bibbee
(74) *Attorney, Agent, or Firm* — Brownstein Hyatt Farber Schreck, LLP

(57) ABSTRACT

A content collaboration platform, such as described herein, may include dynamic object tables that are configured to dynamically populate and/or update. Dynamic object tables may be configured to retrieve content (e.g., page content) from the content collaboration platform and automatically populate attributes from that content directly in the cells of the dynamic object tables. Updates to the page content may also be automatically updated within the table. In some examples, the dynamic object tables may be embedded within pages of the content collaboration platform and, within the same page, the user can edit, filter, and sort the dynamic object table without toggling to other tabs, applications, or documents.

20 Claims, 15 Drawing Sheets

100

218

218c → FORMAT TYPE

○ TAG                                    ⌄

❂ *TAG*

@ *USER*

⊘ *LINK*

218a → PAGE

▤ *PAGE LINK*

⊘ *PAGE STATUS*

🏷 *PAGE LABEL*

ⓘ *PAGE DETAILS*

218b → ITS

☑ *ITS ISSUE*

☑ *ITS ISSUE DETAIL*

[DELETE FIELD] [CLOSE]

220

FIELD SETTINGS

TYPE

220a— ⊘ PAGE STATUS ⌄

220c— ⚠ ARE YOU SURE? CHANGING YOUR FIELD TYPE MAY RESULT IN THE LOSS OF YOUR VALUES AND SETTINGS FOR THIS FIELD.

PAGE LINK*

220b— TITLE ⌄

EDIT OPTIONS

220d— ☑ ENABLE STATUS EDITING

FIELD DESCRIPTION    ⬮ ✕

DELETE FIELD   APPLY   CANCEL

500

502

700

702 — PROCESSING UNIT

704 — MEMORY

714

706 — INPUT DEVICE

708 — DISPLAY

710 — OUTPUT DEVICE

712 — POWER SOURCE

CONTENT COLLABORATION PLATFORM WITH DYNAMICALLY-POPULATED TABLES

CROSS-REFERENCE TO RELATED APPLICATION(S)

This application is a continuation patent application of U.S. patent application Ser. No. 18/399,605, filed Dec. 28, 2023 and titled "Content Collaboration Platforms with Dynamically Populated Tables," the disclosure of which is hereby incorporated herein by reference in its entirety.

TECHNICAL FIELD

Embodiments described herein relate to content collaboration platforms, and in particular, to tables within the content collaboration platforms with linked content.

BACKGROUND

As enterprises get larger and as users become more distributed across an organization, companies rely on collaboration platforms to organize team data and provide resources that facilitate electronic communication. As the volume of data managed by a given platform grows over time, content may become out of date or lose accuracy. Further, manually updating content across a large platform may not be practical or even possible if a platform is used across an entire organization. The systems and techniques described herein can be used to improve the accuracy of data across a platform without the need for manual or explicit updating or content maintenance.

SUMMARY

A method for creating a dynamic object table in a content collaboration platform may include: causing display of a graphical user interface of a content collaboration platform, the graphical user interface having a content panel configured to display content from a page or from a dynamic object table; and a navigational panel comprising a set of hierarchically arranged elements, each element selectable to display a page or a dynamic object table in the content panel. In some cases, the method may receive, at the navigational panel of the graphical user interface, a first user input to create a new element in the set of hierarchically arranged elements. In response to the first user input, display of a dynamic object table in the content panel may be caused. A second input may be received, within a first column of the dynamic object table, the second input including a selection of a particular content item from a set of content items, each content item corresponding to a respective page from the content collaboration platform. In response to receiving the second input, a graphical object may be inserted within a first cell of the first column that corresponds to the particular content item, the graphical object selectable to cause redirection to the content item. In some cases, a third input may be received within a second column of the dynamic object table that includes a selection of a particular attribute category from a set of attribute categories. In some cases, in accordance with a user selecting the particular attribute category, content may be automatically populated from the particular content item that corresponds to the particular attribute category in a second cell of the second column, in line with the first cell, the second cell of the second column may be linked to the particular content item. Display may be caused, within the navigational panel, of the new element corresponding to the dynamic object table.

In some embodiments, in response to a user selection of a first element of the set of hierarchically arranged elements, display of content of a first page within the content panel may be caused. In an edit mode of the first page a link to the dynamic object table may be received. In response to receiving the link, the dynamic object table may be rendered as an embedded object within the content of the first page. A fourth user input may then be received that includes an editing input of a particular cell of the dynamic object table. In response to the fourth user input, the content of the particular cell may change within the dynamic object table; and display of the dynamic object table may be updated within the first page in accordance with the editing input.

In some cases, the method may include receiving, within a third column of the dynamic object table, a fourth input that includes a selection of an external item from a set of external items of an external platform. In response to receiving the fourth input, a graphical object may be inserted, within a third cell of the third column, corresponding to the external item. A fifth input may then be received within a fourth column of the dynamic object table, including a selection of a particular field category from a set of field categories. In some cases, in accordance with a user selecting the particular field category, content from the external item that corresponds to the particular field category in a fourth cell of the fourth column in line with the third cell may be populated.

In some examples, the external platform is an issue tracking platform and the external item corresponds to an issue item managed by the issue tracking platform. In some examples, a fourth input may be received from the user within the second cell of the second column, the fourth input including an edit input of the content. In response to the fourth input: within a particular page corresponding to the particular content item of the first cell, the particular attribute category may be changed in accordance with the edit input; and updated content on the second cell may be displayed in accordance with the change to the particular attribute category of the particular page. In some cases, the particular attribute category is one of a status, an assignee, or a tag. In some examples, the method further determines that a change in content corresponding to the particular attribute category has occurred; and in accordance with the determination, automatically update the content of the second cell in accordance with an updated content.

In some embodiments, a method for viewing a dynamic object table in a page of a content collaboration platform may include: causing display of a graphical user interface of a content collaboration platform, the graphical user interface having a content panel configured to display content from a page or from a dynamic object table; and a navigational panel having a set of hierarchically arranged elements with a first element corresponding to a first page, a second element corresponding to a second page, and a third element corresponding to a dynamic object table. Next, display may be caused, within the content panel, of the first page, the first page having a first embedded object corresponding to the dynamic object table, the dynamic object table including a set of rows and columns having linked pages from the content collaboration platform and associated attributes automatically extracted from the linked pages. Within the content panel and while displaying content of the first page: a first filter criteria may be received for at least one column of the first embedded object. In response to receiving the first filter criteria, display of the first embedded object may be updated to a first view, the first view in accordance with the first filter criteria, the first view may include a first subset of rows and columns less than the set of rows and columns of the dynamic object table. Next, content of the second page may be displayed. The content of the second page may include a second embedded object corresponding to the dynamic object table. Within the content panel of the second page, a second filter criteria may be received that is different from the first filter criteria for the at least one column of the first embedded object. Next, in response to receiving the second filter criteria, display of the second embedded object may be updated to a second view in accordance with the second filter criteria, the second view may include a second subset of rows and columns different from the first subset of rows and columns and less than the set of rows and columns of the dynamic object table, each the first and second views coexisting independently in their respective pages.

In some examples, within a client device of another user, the first page may be displayed, the display of the first page may include the dynamic object table filtered according to the first view. In some cases, in response to a change to a linked object, updated data may be received corresponding to a cell of the dynamic object table. The method may determine that the updated data fails the first filter criteria, and in response to the updated data failing the first filter criteria, remove a row associated with the cell from the first view.

In some cases, the embedded dynamic object table within the first page includes a view menu selectable to toggle between the first view and an unfiltered view. In other examples, a set of views available in the view menu may be unique to the first page. In other embodiments, the first filter criteria is a status, an assignee, or a tag.

A method for creating a dynamic object table in a content collaboration platform with a dynamic object table having linked native and non-native content may include: causing display of a graphical user interface of the content collaboration platform, the graphical user interface including a content panel configured to display content from a page or from a dynamic object table; and a navigational panel comprising a set of hierarchically arranged elements corresponding to a page and a dynamic object table, each element selectable to display a page or a dynamic object table in the content panel. In response to a user input, the dynamic object table may be displayed within the content panel. Next, a path to a first object may be received at a first column. In response to the first object being a native object: a set of attributes from the native object may be retrieved; it may be determined that a second column designates a first attribute from the set of attributes and is linked to the first object; and the first attribute within the second column may be automatically populated. Next, a path to a second object may be received, at a third column, the second object corresponding to an external platform different from the content collaboration platform. In response to the second object being a non-native object: the external platform associated with the second object may be identified, it may be determined that the external platform is a registered platform registered with a dynamic object table service of the content collaboration platform; in accordance with determining that the second object corresponds to the registered platform, user access to the external platform may be authenticated; a field selection may then be received within a fourth column corresponding to a first field of the second object; data from the first field may be retrieved; and the data from the first field within the fourth column may be displayed.

In some examples, the method further includes: in response to a user selecting an element within the navigational panel, causing display of a particular page in the content panel; receiving, within the content panel, an embed request comprising a link to the dynamic object table; inserting, within a content region of the particular page, the dynamic object table; in response to an edit input in a cell within the embedded dynamic object table: determining whether the cell includes a native or a non-native object; and in response to the cell including the native object, updating, within a source content, the native object in accordance with the edit input.

In some cases, in response to the cell including non-native object, the edit input from the user may be suppressed. In some examples, a filter input from the dynamic object table may be received within the content region of the particular page. Then, the dynamic object table may be updated in accordance with the filter input. In some examples, in accordance with another user accessing the particular page, the dynamic object table filtered according to the filter input may be displayed.

In some examples, the registered platform is an issue tracking platform. In some cases, the method includes: receiving, within the second column, a request to designate a second attribute from the set of attributes different from the first attribute; deleting, from the second column, data corresponding to the first attribute; and automatically populating cells of the second column in accordance with the second attribute.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
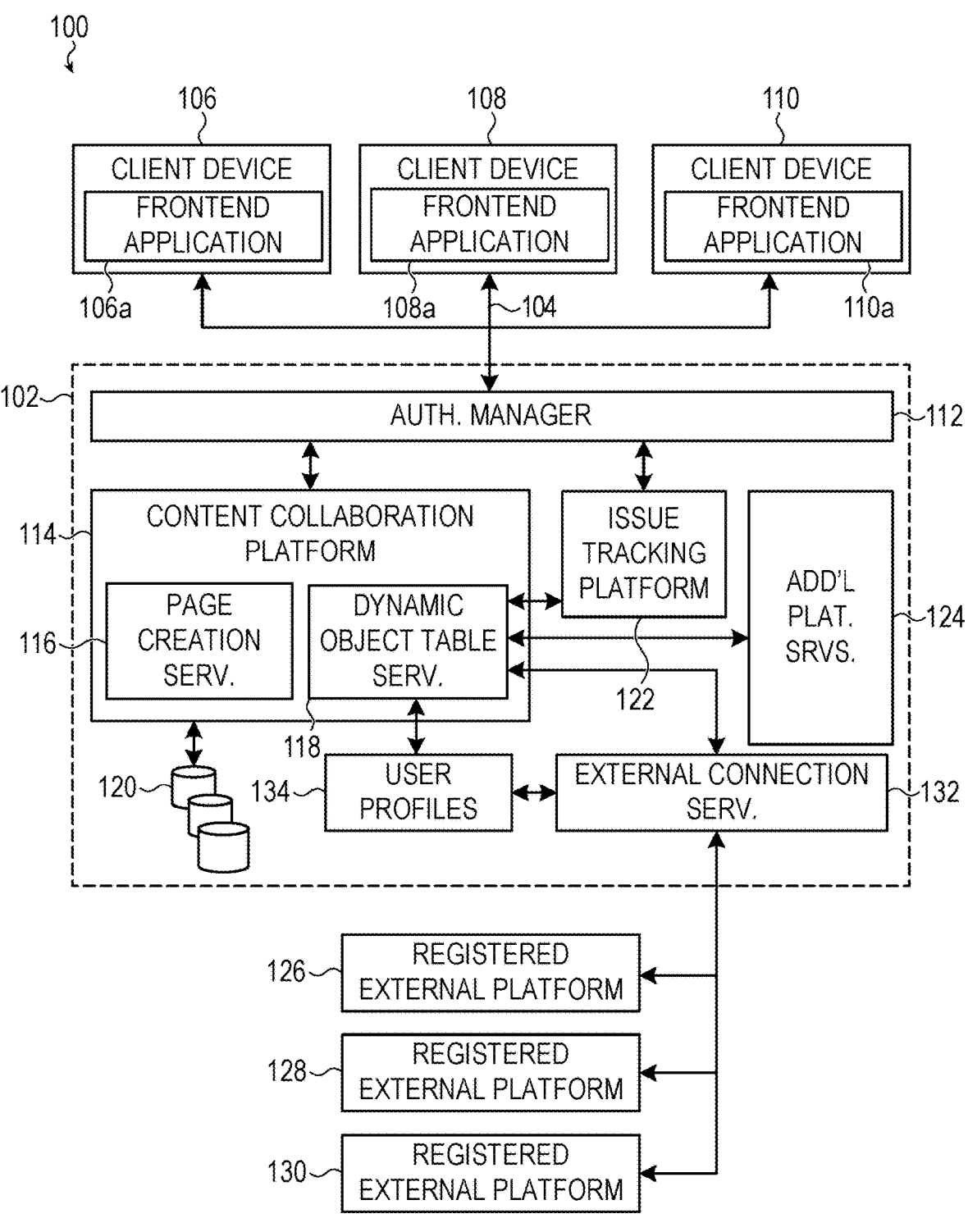
FIG. 1 depicts a system diagram of a content collaboration system with dynamic object tables, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein. Accordingly, they may not necessarily be presented or illustrated to scale and are not intended to indicate any preference or requirement for an illustrated embodiment to the exclusion of embodiments described with reference thereto.

DETAILED DESCRIPTION

Embodiments described herein relate to content collaboration platforms with native tables that are configured to dynamically populate and/or update. The tables, referred to as dynamic object tables, may retrieve content (e.g., page content) from the content collaboration platform and automatically populate attributes from that content directly in the cells of the dynamic object tables. Updates to the page content may also be automatically updated within the table. Embodiments described herein also include systems and methods for embedding those dynamic object tables within pages of the content collaboration platform. Within the embedded object of the page, the user can edit, filter, and sort the dynamic object table without toggling to the dynamic object table interface.

Content collaboration platforms are useful tools for collaborating and working together as a team in real time. Often, content collaboration platforms are a central hub for teams to access documents which, in turn, draw information from many sources in one, convenient place. As a central hub, users of content collaboration platforms can quickly view, comment, and link to content. In many cases, users opt for using tables as an efficient way to organize and view data. For example, a document in a content collaboration platform may include a write-up explaining the scope of a project, embedded in-line frames with a table showing project metrics from another platform, other links showing metadata from publicly-available websites, and the like.

However, in many cases, the contents of a table are static. For example, in some cases, users may create a table within a page to track a particular's team's progress in a project. While this snapshot is convenient for showing only the information expressly provided by a user, generating this explicit or static content for each page is time consuming and the information may be easily outdated as the project progresses. Moreover, users that may wish to leverage the table for other purposes need to make copies of the table to prevent changing the content in the table. This results in more storage space and time needed to show different aspects (e.g., a filtered view, views with certain columns hidden, a sorted view) of the same table, and more time is needed for switching between desktop applications to edit and/or filter the content. This can cause frustration in users and a diminished user experience.

The content collaboration platform described herein includes dynamic object tables which are native to the content collaboration platform. Dynamic object tables are tables that can include dynamically-updating content that may be external or internal to the content collaboration platform. For example, a dynamic object table can include references to pages of the content collaboration platform as well as attributes from those pages or sources. These attributes may be automatically extracted and updated within the dynamic object table. In many cases, the dynamic object table can include linked content to external platforms and associated metadata (e.g., fields, attributes).

More plainly, a dynamic object table is a way for teams to organize and visualize information, which can be updated in real time and/or periodically. In this configuration, users can create standalone dynamic object tables and embed those tables, as a native item, within pages of the content collaboration platform. Because it is a native object, the user can modify, view, sort, and edit items in the embedded content without toggling away from the page. For example, a dynamic object table may include graphical objects corresponding to content items for pages in the content collaboration platform in a first column and a "status of the page" attribute in a second column. In this example, the "status of the page" attribute may be automatically populated by the dynamic object table using data from the corresponding page that is linked to the second column (e.g., the content items in the first column). Then, the user may edit a cell of the second column to, for instance, change a status from "in progress" to "done." In this example, the status of the page in the content collaboration platform may be updated and, subsequent to updating the status within the page, the update may be reflected in the dynamic object table. In some examples, data can be updated within the dynamic object table main view or via an embedded item of the dynamic object table within the page.

In some embodiments, embedded dynamic object tables may be sorted and/or filtered. For example, a user may filter by a value of a column, assignee, or other criteria. In this configuration, users that wish to tailor a dynamic object table to certain items in the table can do so without toggling away from the page. Once a user sorts and/or filers a table, the view can be saved within the page. Thus, if a user navigates back to the page and/or if other users navigate to the page, the sorted and/or filtered view is shown. Similarly, the dynamic object table may be embedded in other pages and filtered under different criteria. Thus, a user navigating to the multiple pages with an embedded dynamic object table that links to the same source sees different views of the embedded table, depending on the filter criteria on each one. In other words, the views of the embedded dynamic object table in different pages (or in different embedding instances) may be independent of each other. Thus, multiple users can leverage the same dynamic object table for different views without affecting linked versions of the table and without affecting the underlying dynamic object table document.

As explained above, the dynamic object table may be native to the content collaboration platform. Accordingly, the dynamic object table may include native objects (e.g., pages from the content collaboration platform, whiteboard items within the content collaboration platform) and non-native objects (e.g., issue items from an issue tracking platform, action items from a project management platform). When a user input is received, a determination may be made whether the item is a native object or a non-native object. In cases where the input requested is a native object, data may be automatically populated and displayed within the dynamic object table. In cases where the input requested corresponds to a non-native object, the user may be authenticated (e.g., by providing user credentials, tokens, and the like). If the authentication is successful, the requested data (e.g., fields in an issue items) are retrieved. If the authentication fails, no data may be populated and/or an error message may be displayed. In some embodiments, non-native objects populated in a dynamic object table may be displayed upon successful authentication of a user accessing the table. However, in some examples, users without access to the external platforms may view the data imported within the dynamic object table.

These foregoing and other embodiments are discussed below with reference to FIGS. 1-7. However, those skilled in the art will readily appreciate that the detailed description given herein with respect to these figures is for explanation only and should not be construed as limiting.

FIG. 1 shows an example simplified system diagram 100 of a system with a content collaboration platform configured to create and embed native dynamic object tables. The system 100 is depicted as implemented in a client-service architecture, though other implementations and architectures are possible. The system 100 may include a set of host servers, which may be one or more virtual or physical computing resources (e.g., as a cloud platform). More generally, the system 100 may include a backend system 102 which may, in turn, includes the infrastructure and services through which information technology (IT) and/or enterprise service management services are provided.

In some cases, a backend system 102 may be communicatively coupled via a network 104 to client devices 106, 108, and/or 110. Client devices, such as devices 106, 108, and 110, may be any suitable electronic device including laptops, tablets, smartphones, desktops, and the like. Each of the client devices 106, 108, and 110 may be associated with a different user having different user accounts, different permissions, and different access to the multiple platforms of the backend system 102. The client devices 106, 108, and 110 may each be operable to instantiate different instances of a frontend application 106a, 108a, and 110a, respectively, on each device. The frontend applications 106a, 108a, and 110a may be of any of the platforms and/or services of the backend system 102.

The backend system 102 may be configured to support infrastructure for one or more backend applications. These application may be associated with different software platforms that are part of or support the backend system 102. Client devices 106, 108, and 110 can access applications or services of the backend system 102 via an authentication manager 112. The authentication manager 112 may provide the authentication to each request before it is forwarded to other platforms or services. In some embodiments, the authentication manager 112 may be authentication instances which may be platform- or service-specific. More generally, the authentication manager 112 authenticates devices (e.g., client devices 106, 108, and 110) based on, for example, user credentials. For example, the authentication manager 112 may receive usernames, passwords, pins, passphrases, biometric data, or other user-identifying information. The user authentication data may be stored and/or tracked using tokens, cookies, or other data elements. Upon successful authentication by the authentication manager 112, the client devices 10, 108, and 110 may access the platforms and/or services of the backend system 102.

In some embodiments, the backend system 102 includes a content collaboration platform 114. As explained above, platforms, like the content collaboration platform 114, may be accessed upon successful authentication by the authentication manager 114. The content collaboration platform 114 may include multiple services, like the page creation service 116 and the dynamic object table service 118, which allows users to create and share content in real time to enhance collaboration between teams. For example, via the page creation service 116, users can create pages (e.g., electronic documents) that can include a variety of content.

Content may include user-input text, tables, embedded dynamic object tables, links, in-line frames, pictures, videos, digital content, and the like.

Within the same content collaboration platform 114, a dynamic object table service 118 is provided. The dynamic object table service 118 and the page creation service 116 are provided together in the content collaboration platform 114 to enhance user experience. As explained above, the dynamic object table service 118 is configured to generate tables. These tables may include linked content from pages (e.g., created via the page creation service 116) of the content collaboration platform 114. As an example, a user generating a dynamic object table may specify (e.g., in a column of the table) a data category from which to retrieve data, which may be retrieved from database services 120. For example, the user may specify the "TITLE" of a page as the data category. An input-selection window, such as a drop down menu, with a listing of pages within the content collaboration platform may be displayed. The user may select a page which then populates a cell of the dynamic object table. In subsequent columns, the user may select different attribute categories, such as status, description, tags, and the like. Once an attribute category is designated to a column, content items from the selected pages are linked (e.g., across rows). In this configuration, content from columns with the selected attribute category automatically populates the attribute from the page. By automatically retrieving attributes from the page, a user can quickly populate the dynamic object table with the desired information. Importantly, the information is kept up to date. Thus, any changes to the underlying attribute shown in the table are updated in the table.

Similarly, the dynamic object table service 118 can be configured to retrieve content items from other platforms, such as the issue tracking platform 122. The issue tracking platform 122 may manage issue items, such as those relating to IT issues. Each of the issue items may include a series of fields, which provide details on the issue item to reach resolution. For example, fields can include description, hardware, version of software, date initiated, status, assignee, and the like. The dynamic object table service 118 may be communicatively coupled to the issue tracking platform 122. Upon receiving a user input designating a column as issue items from the issue tracking platform 122, the dynamic table service 118 may retrieve content items representing issue items from the issue tracking platform 122. Based on linking to the issue tracking platform, the user may select fields from the issue tracking platform 122 as a column category. Based on the corresponding issue item selected (e.g., across the same row), the selected field may be retrieved and populated within the designated column. Since the issue tracking platform 122 is not native to the content collaboration platform 114, additional authentication and cross-referencing may be performed to accurately retrieve the desired fields and maintain those data items that are populated from the issue tracking platform 122 updated.

As another example, the dynamic object table service 118 may be communicatively coupled to additional platforms and services 124. For example, the dynamic object table service 118 may be configured to retrieve content, such as attributes, metadata, fields, from platforms such as Kanban boards, source-code management systems, project management systems, help desks, directories, and the like.

In some embodiments, the dynamic object table service 118 may be configured to retrieve data from external platforms, such as registered external platforms 126, 128, and 130. Retrieving data from external platforms, such as registered external platforms 126, 128, and 130, enables users to consolidate information into a single interface. In this example, the dynamic object table service 118 may be communicatively coupled to an external connection service 132. The external connection service 132 may retrieve and/or manage the user's credentials (e.g., via user profiles 134) to be able to access the registered external platforms 126, 128, 130. Further, the external connection service 132 may provide the application programming interface (API) gateway to communicate and/or to retrieve data from the registered external platforms 126, 128, and 130 and transmit the data to the content collaboration platform 114 and/or to the dynamic object table service 118.

In the above configuration, the dynamic object table service 118 can retrieve and update data from platforms that are external to the backend system. Similar to explained above, this allows users to visually consolidate content in one place without toggling to multiple platforms to extract the information.

These foregoing embodiments depicted in FIGS. 2A-7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIGS. 2A-2E depict an example graphical user interfaces that enable the creating and adding of content items in a dynamic object table. By creating dynamic object tables in the content collaboration platform, users can specify content, such as pages, from the content collaboration platform and/or content from external platforms and retrieve data (e.g., attributes, metadata) from those content items. Thus, the dynamic object table automatically populates the designated data and automatically updates saving the user time and reducing scrivener errors.

Figure 2A:
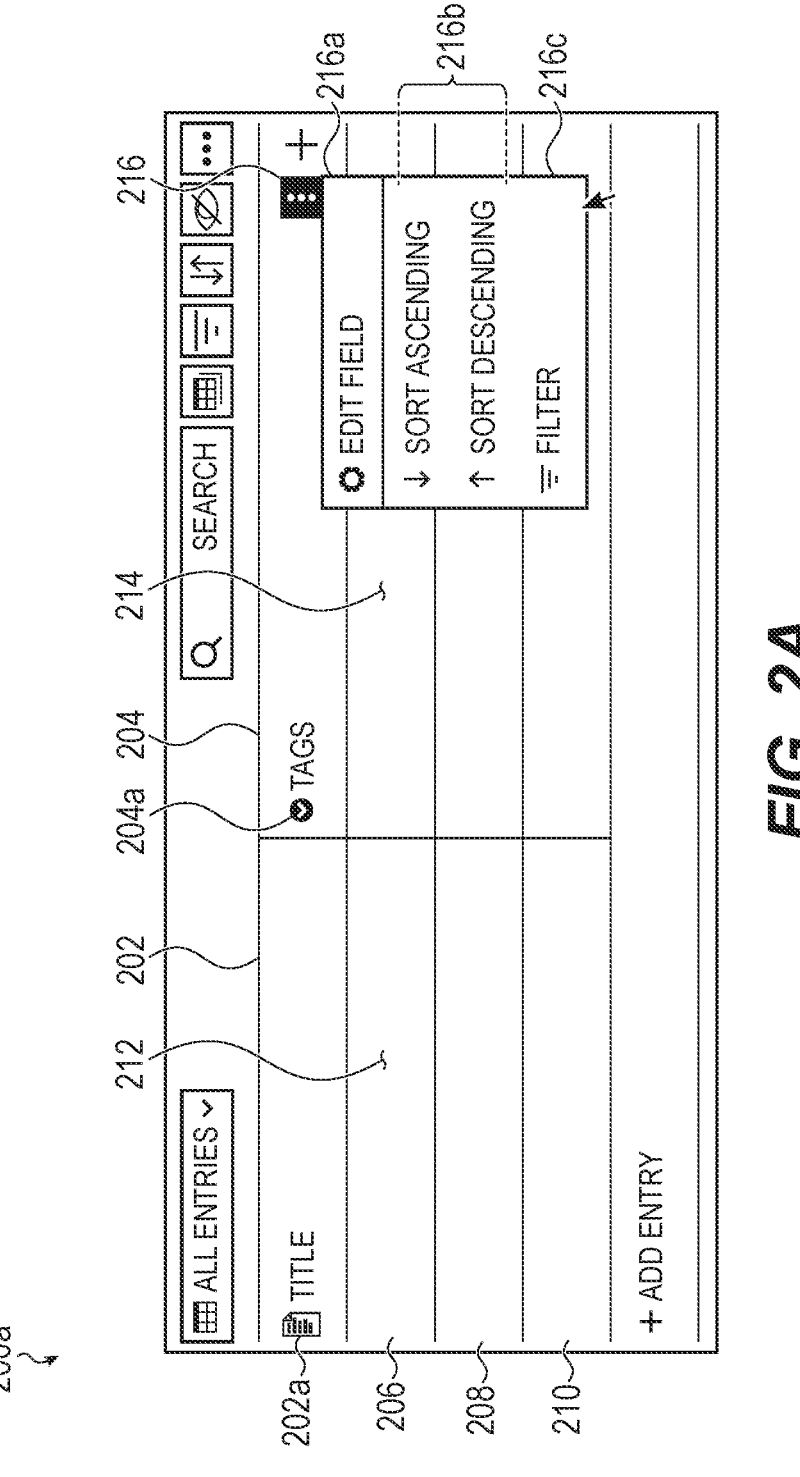
FIGS. 2A-2E depict example user interfaces for creating a dynamic object table.

FIG. 2A shows an example graphical user interface of an empty dynamic object table 200a. This graphical user interface is part of a content collaboration platform (see, e.g, FIG. 3) and may be accessed via a browser within a client device. As depicted, the dynamic object table 200a may include a series of columns (e.g., columns 202 and 204) and a series of rows (e.g., rows 206, 208, and 210) having respective cells (e.g., cell 212, 214) where data is received. Each column (e.g., columns 202 and 204) may have a designated category which defines the type of data to be input in the corresponding column. For example, column 202 may have the category 202a designated to a "page." More specifically, the category 202a may be a title of a page within the content collaboration platform. As shown in the figure, the designated category 202a is represented by the graphical element which indicates to the user the acceptable input within the designated category. Similarly, column 204 may have the category 204a designated to an attribute category of the page from column 202. More specifically, the category 204a may be the "TAGS" attribute from the page of column 202.

In some examples, the designated category for each column may be user-defined. As depicted, each column may include a drop down menu 216. The drop down menu 216 may provide the user an option to edit fields 216a, sort column 216b, and filter 216c. In some cases, the drop down menu 216 may appear upon a user hovering over the column 204 while the view of the menu 216 may be suppressed when the user is not navigating over the column 204.

Figure 2B:
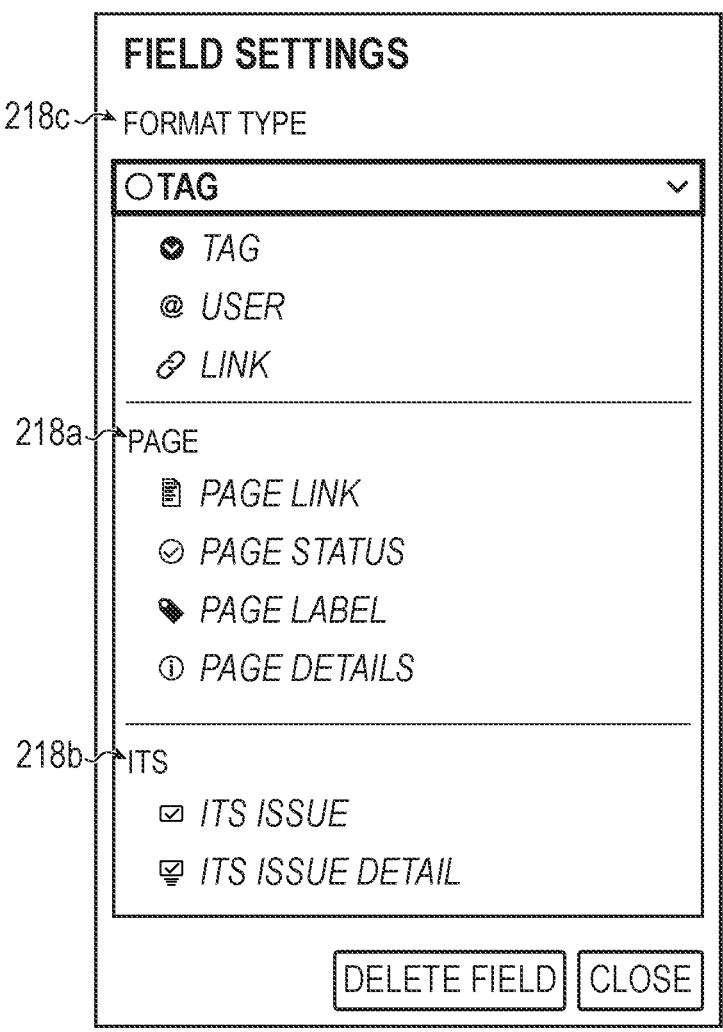

FIG. 2B shows an example editing menu 218 for editing each column category. Depending on the category type, such as category types 218a, 218b, and 218c, different options may be presented to the user. Each category enables a user to specify a content type (such as a page in a content collaboration platform, an issue item in an ITS) from which to pull data and what data attribute to retrieve. One category type may be attribute category 218a, which is configured to retrieve attributes from the pages from the content collaboration platform linked to the row (or linked via other criteria). For example, an attribute category 218a may include a page link, page status, page label, and page details. In some embodiments, the attributes are automatically updated in the cell of the column corresponding to the update. In other words, after specifying a "PAGE" (from the content collaboration platform), the attributes available to be retrieved from pages are presented (e.g., listed as page link, page status, page label, page details, in the figure).

As another example of a category type may be a field 218b of an issue tracking system (ITS). Each of the fields (e.g., ITS issue, ITS issue detail) may be retrieved from the ITS and are linked to specific issue items input in a column of the dynamic object table. Similarly, the value of those fields can be updated automatically within each cell of the dynamic object table.

As another example, the user may elect the category type 218c "FORMAT TYPE" to manually input data in the cells and format the manually-input data according to the selected category type. For example, upon selecting this category (e.g., tag, user, or link), user inputs are automatically formatted in accordance with the selection. As another example, a user typing a name in a cell may select from a drop down list of existing users and, if the user is not found, the dynamic object table may prompt the user to create a user card within the content collaboration platform. As another example, if the user is not found, the dynamic object table may generate an invitation dialog to invite the prospective user into the content collaboration platform (e.g., as a guest user, as a tenant user).

Figure 2C:
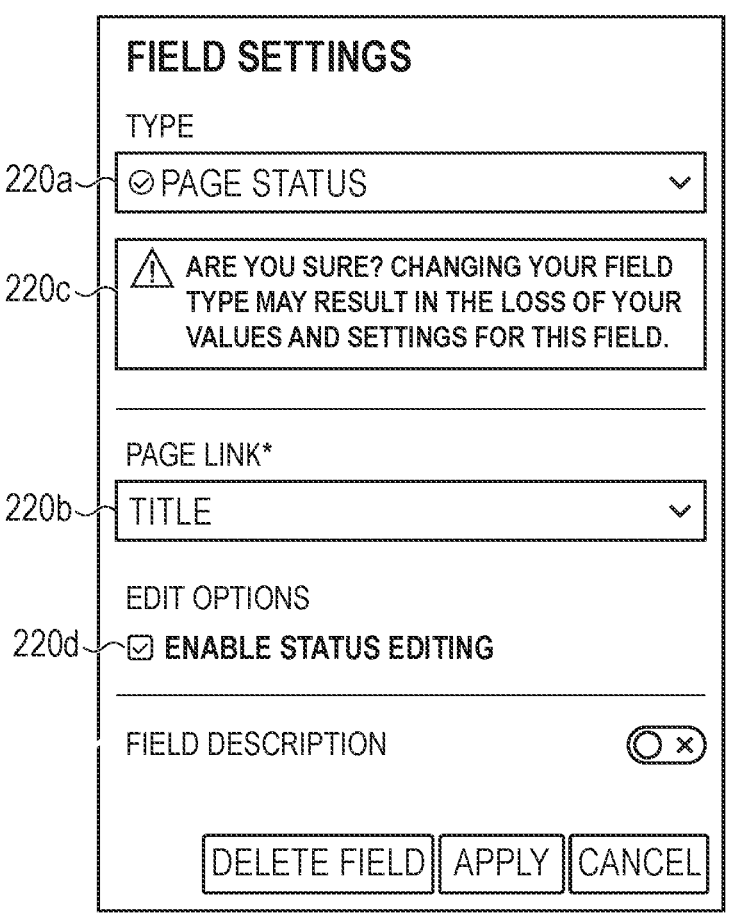

FIG. 2C shows an example graphical user interface menu 220. As depicted, a user may link the selected category type (e.g., the "PAGE STATUS" attribute category 220a) to particular columns. In this example, the user may choose from a menu 220b (e.g., a drop down menu) to select the column (e.g., "TITLE" column) which is configured to receive content items from pages of the content collaboration platform as input.

In some embodiments, if the user changes a type (e.g., the "PAGE STATUS"), the user may be presented with a notification and/or warning 220c. Because the values and/or strings within columns are automatically populated, changing the attribute designated to the column results in replacement of the data with the designated attribute. Due to this configuration, a user can easily toggle between attributes in a column and the data may be re-populated accordingly.

In some cases, as shown in FIG. 2C, the user may also be presented with the option to enable editing 220d. This option may allow a user to edit values of the cell directly within the dynamic object table. In this configuration, editing a value of a cell (which has been automatically populated) results in the underlying data of the page to also be updated. Thus, a user may quickly update a status of one or multiple cells without navigating to the particular page and manually editing it.

Figure 2D:
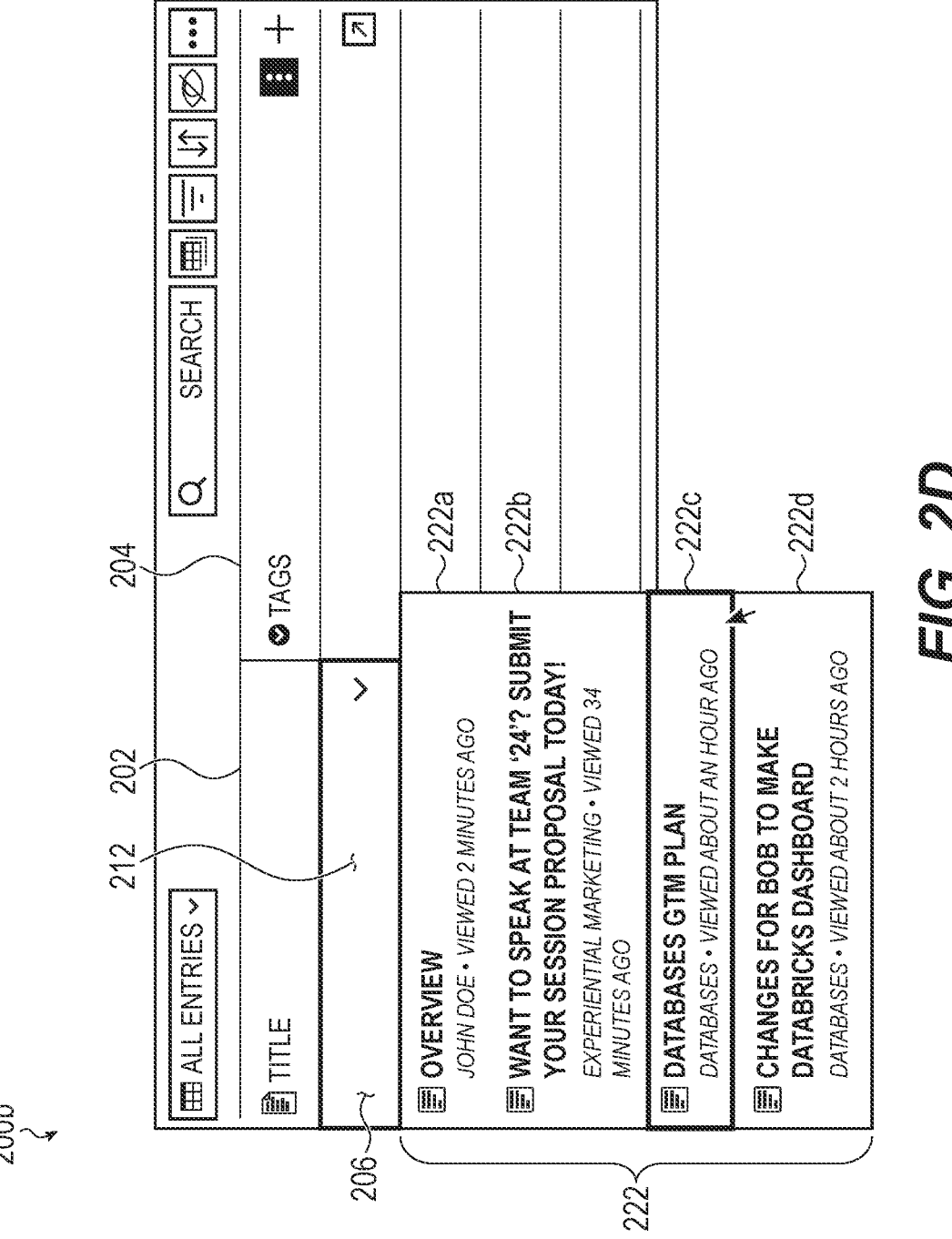

FIG. 2D shows an example graphical user interface of the dynamic object table 200b including the selections from the menus shown in FIGS. 2B and 2C. As depicted, the first column 202 is configured to input content items from pages in the content collaboration platform. Accordingly, upon selection of a cell, such as cell 212, a menu 222 may be displayed that includes a selection of content items (e.g., content items 222a-d). Each of the content items 222a-d correspond to a page of the content collaboration platform. In some cases, as depicted, the pages may be selected within the menu based on a last viewed criteria. In other embodiments, the pages may be selected to be display based on other criteria, including recently edited, favorites, alphabetical order, created by, tagged in, and the like. In some examples, a predictive algorithm, a machine learning algorithm, or the like may be used to generate a recommendation of the pages. For example, based on user logs, dynamic object table title, recently used pages, and the like, a set of recommendations for pages may be generated and displayed as content items within menu 222.

Figure 2E:
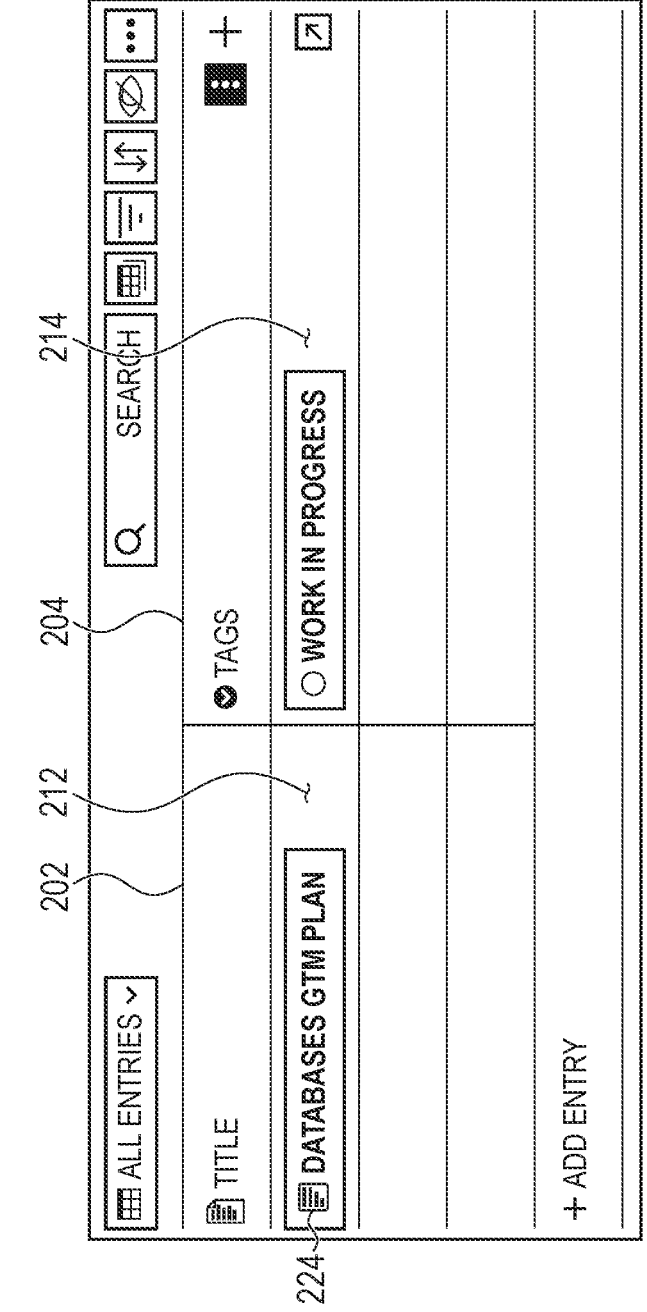

FIG. 2E shows an example graphical user interface of the dynamic object table 200c including a selection of a content item 222c from FIG. 2D. As depicted, once a user selects a content item (e.g., content item 222c), a graphical object 224 is inserted into cell 212. In some examples, the graphical object 224 may be selectable and configured to redirect the user to the page that corresponds to the graphical object (e.g., the DATABASES GTM PLAN page). After inserting graphical object 224, the contents of cell 214 automatically populate in accordance with the attribute category (e.g., PAGE STATUS) selected in FIG. 2C. More specifically, data from the DATABASES GTM PLAN page is retrieved to populate the PAGE STATUS of cell 214. In some embodiments, additional formatting, such as a color status indicator, may be retrieved and displayed within the cell. In some examples, when the status of the page changes, the content in cell 214 is updated in accordance with the change of the underlying page. In some cases, the cell may be highlighted to indicate to the user that a cell has been updated recently.

Figure 3:
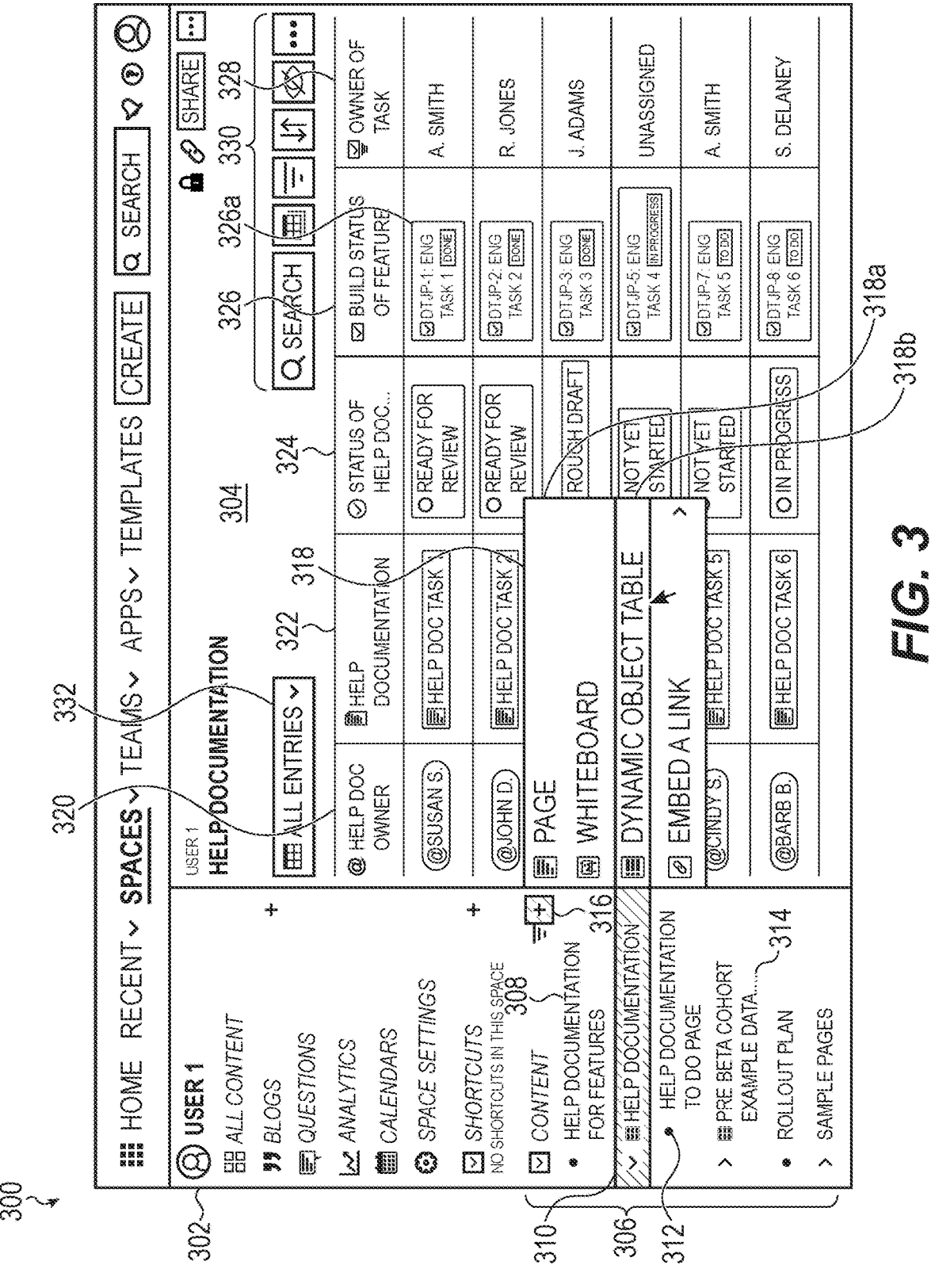
FIG. 3 depicts a graphical user interface of a content collaboration platform that includes a dynamic object table, such as described herein.

FIG. 3 depicts a graphical user interface 300 of a content collaboration platform with dynamic object tables. As depicted, the content collaboration platform graphical user interface 300 may include two main regions: a navigational panel 302 and a content panel 304. The navigational panel 302 includes a page tree 306 having elements (e.g., elements 308, 310, 312, 314) that correspond to content from both pages and from dynamic object tables. Each of the elements 308, 310, 312, 314, may be arranged hierarchically. For example, element 310 (corresponding to a dynamic object table) may have a parent relationship with respect to element 312 (corresponding to a page). While a dynamic object table is shown as a parent element, pages may also be parent elements with respect to dynamic object tables and with respect to other pages. In some embodiments, the hierarchical arrangement of the page tree 306 is user-defined. The page tree 306 may list elements corresponding to pages and dynamic object tables within a space (e.g., based on a project, a user, and the like).

As mentioned above, because page and dynamic object tables are native to the content collaboration platform, both elements are displayed concurrently in the navigational panel 302. In some embodiments, elements corresponding to pages, such as elements 308 and 312, may have different graphical indicators than elements corresponding to dynamic object tables, such as elements 310 and 314. These different graphical indicators help indicate to the user the element type. Each of the elements (e.g., elements 308, 310, 312, 314) may be selectable by the user. Upon selecting an element, such as element 310, the contents of the element are displayed in the content panel 304.

In some embodiments, a user may create new pages and/or dynamic object tables from the navigational panel 302. For example, the user may select expandable menu 316 which displays a content creation menu 318. The content creation menu 318 may include options to create native content, such as pages 318a and dynamic object tables 318b. After a user selection of an item from the content creation menu 318, a new element is created within the navigational panel 302, which is draggable to establish a parent/child relationship, and a blank content page or table is displayed within the content panel 304.

As described above, the content panel 304 displays content from pages or dynamic object tables. The content of the dynamic object tables may have assigned categories which indicate where to pull content items from to automatically populate the table. As depicted in FIG. 3, content from a dynamic object table, corresponding to element 312 of the page tree 306, is displayed. As described as to FIGS. 2A-2E above, each column of the dynamic object table may correspond to a category (such as a format type, an attribute category, a field) which defines where data is drawn from. For example, column 320 corresponds to an assignee format type which draws data from a user database of the content collaboration platform and/or from other platforms within an enterprise's system; column 322 corresponds to a page which draws information from particular documents in the content collaboration platform; column 324 corresponds to an attribute category which draws data from the page from column 322; column 326 corresponds to an issue item and draws data from an ITS; and column 328 corresponds to a field from the issue item which draws in column 326. As explained above, the columns whose underlying content is retrieved from native and non-native sources, may be populated by the dynamic object table service and updated in accordance with any changes to the specified attribute and/or field, respectively. In some cases, as shown for column 326, issue items may displayed with an identifier (e.g., issue title or other identifying information) as well as additional information of the issue item. For example, issue status may be shown within the graphical object of the issue item (e.g., graphical object 326a). The issue status may provide users additional information that is updated to keep the user appraised of the issue status.

For columns 326 and 328, relating to an ITS, a system determines that this is a non-native application and, accordingly, authentication of the user is confirmed prior to retrieving data from the ITS. In some examples, user credentials are retrieved (e.g., via a pop-up window for the user to enter credentials). In other examples, an authentication token or other authentication protocol is used to validate user permissions in the ITS. Regardless of how the user is authenticated, based on the permissions of the user in the ITS, the issue items and underlying data within columns 326 and 328 may be displayed or restricted in the dynamic object table. In the case the issue item and underlying data is restricted to the user, the dynamic object table may display an error message or data may not be displayed as to the items (e.g., cells within columns 326 and 328) to which the user does not have access. Thus, a user can still take advantage of the dynamic object table without viewing restricted content. In other embodiments, data for the ITS is populated and viewed based on the dynamic object table's creator access and certain fields may be visible regardless of other users' access to the ITS. In this embodiment, issue items may not be selectable to redirect to the ITS and visible fields may be limited to fields without sensitive information that may require authentication.

Back to FIG. 3, within the content panel 304, the dynamic object table may include a table menu 330. The table menu 330 may be configured to filter, sort, search, change views, and so on. A filtered or sorted view of the dynamic object table may be saved and, in response to a user selection of selectable item 332, the user may select a previously-saved view. In some examples, the saved views may be saved for any user to access.

Figure 4A:
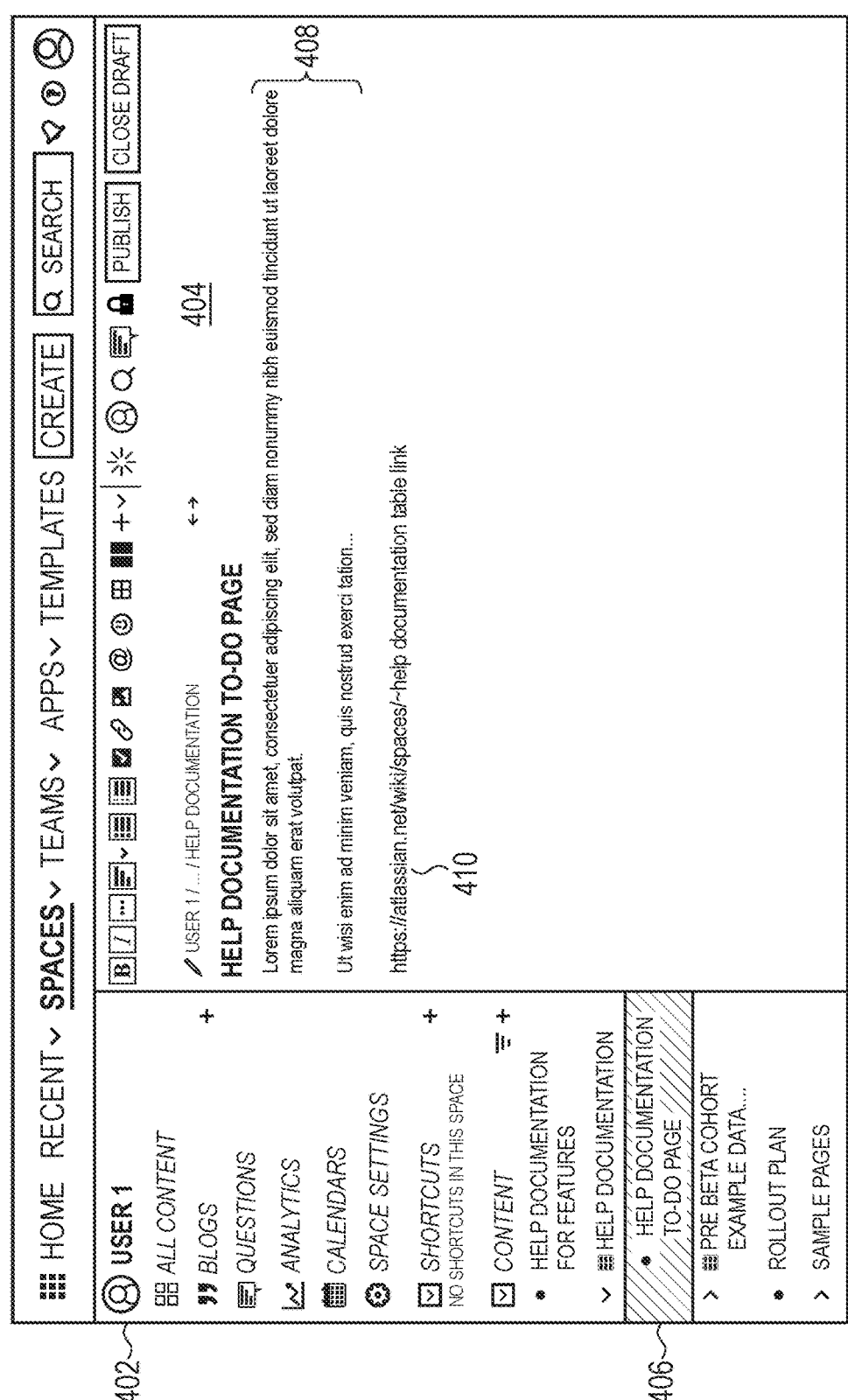
FIGS. 4A and 4B depict an example graphical user interface of a page of the content collaboration platform that includes a dynamic object table, such as described herein.
Figure 4B:
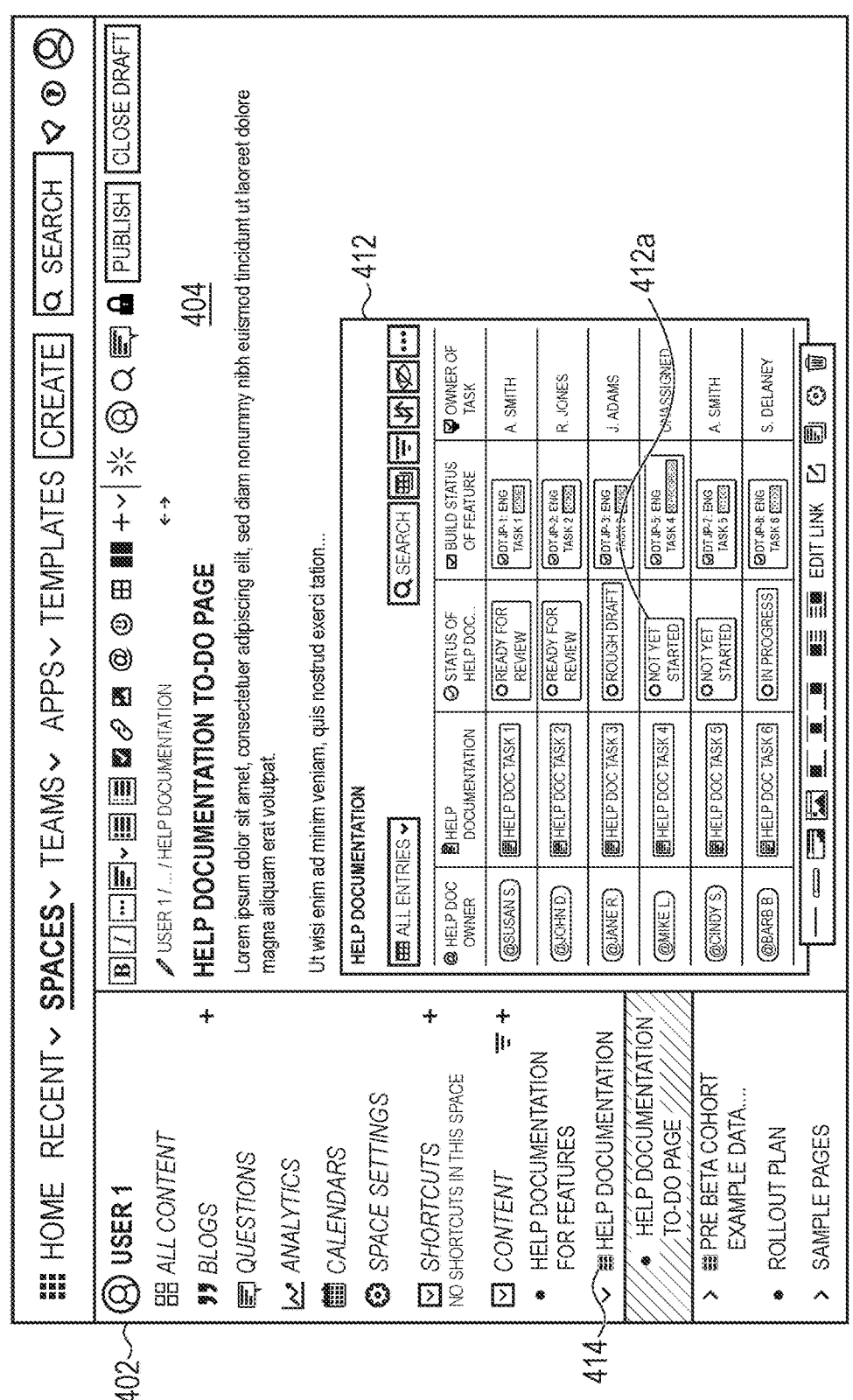

FIGS. 4A and 4B show example graphical user interfaces 400 that depict inserting a dynamic object table in a page of the content collaboration platform. Unlike dynamic object tables, pages in content collaboration platforms can include a variety of different data items, such as text 408. Pages can also include embedded items from native pages or dynamic object tables, in-line frames, links, videos, multimedia, and the like. As shown in FIG. 4A, a user may access a page via the navigational panel 402 by selecting element 406 within the page tree. Upon selection of element 406, page content is displayed in the content panel 404. In some cases, users are able to edit the page (e.g., transition to an "edit mode"). In edit mode, a user may input a link 410, such as a URL, corresponding to the dynamic object table.

As shown in FIG. 4B, upon adding the link to the dynamic object table, the dynamic object table 412 may be automatically embedded within the page. Because the dynamic object table 412 is native to the content collaboration platform, the embedded item may have the same functionality as the standalone dynamic object table item. For example, in edit mode of the page, a user may edit the content of the cells of the dynamic object table 412. These edits may be saved and updated within the dynamic object table. Thus, if the user toggles to the dynamic object table element 414, the edited content will be displayed.

Moreover, in some embodiments, a user may edit content relating to an attribute category within the dynamic object table embedded within the page. For example, a user may update cell 412a having a "NOT STARTED" status to "IN PROGRESS." In response to the edit input from the user, the status of the underlying page, HELP DOC TASK 4, may be automatically updated.

For non-native items, such as those relating to an ITS, an edit input may be locked from editing. In some embodiments, non-native items that have been manually edited may display a warning or other graphical indication to the user that the data has been manually input and is not being updated. In some embodiments, editing of non-native items may be enabled (e.g., via an API call).

Figure 5A:
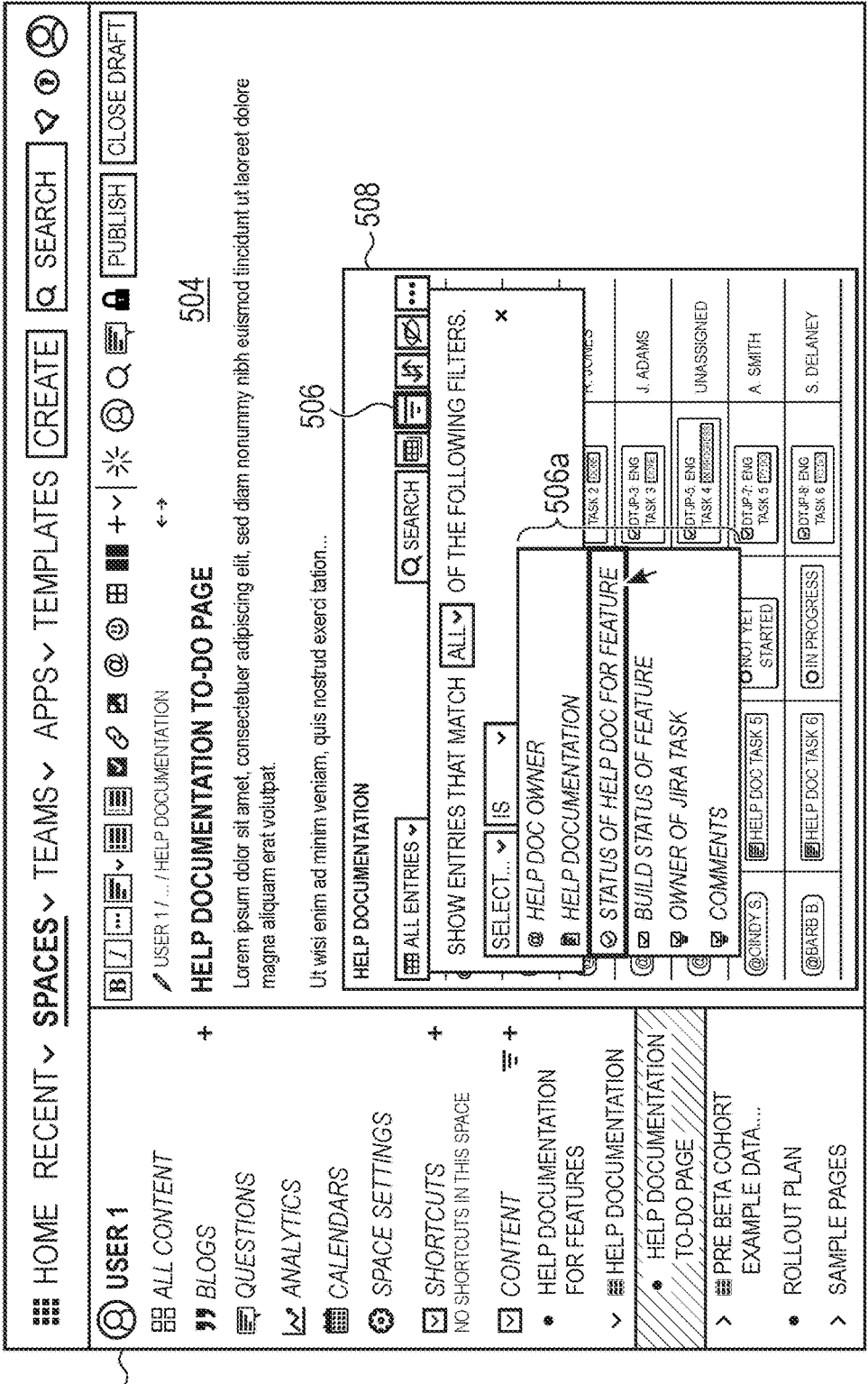
FIGS. 5A-5D depict an example graphical user interface for sorting and/or filtering a dynamic object table.
Figure 5B:
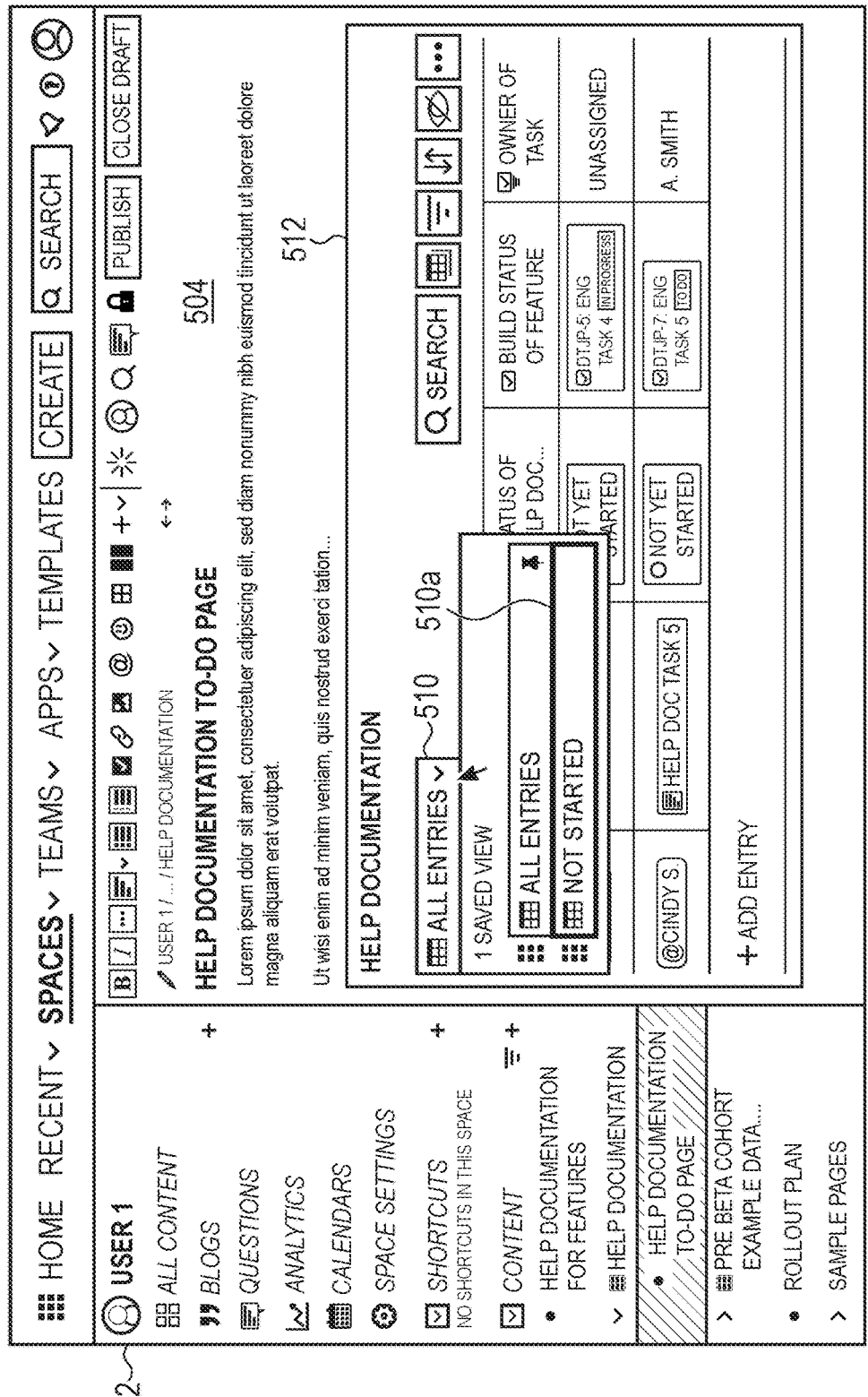

FIGS. 5A-5D show example graphical user interfaces 500 to illustrate how a user may apply different filters to the embedded dynamic object table within the page. As explained above, the graphical user interface may include a navigational panel 502 and a content panel 504 which provides the user navigational and/or viewing options. As shown in FIG. 5A, a user may select different filter criteria from a filter menu 506. For example, the filter menu may include a selectable sub-menu 506a which allows a user to select a column of the dynamic object table 508 under which to apply a filter criteria. As shown in FIG. 5B, once the filter criteria is applied, a filtered dynamic object table 512 is presented and the filter parameters may be saved in view option 510a. In an edit mode of a page, different filter criteria may be added by a user. When the page is in view mode (e.g., not configured to be edited), users may leverage existing filter criteria views 510 previously saved during the edit operation. In some embodiments, additional filter criteria may not be applied to other users' views while in view mode.

Figure 5C:
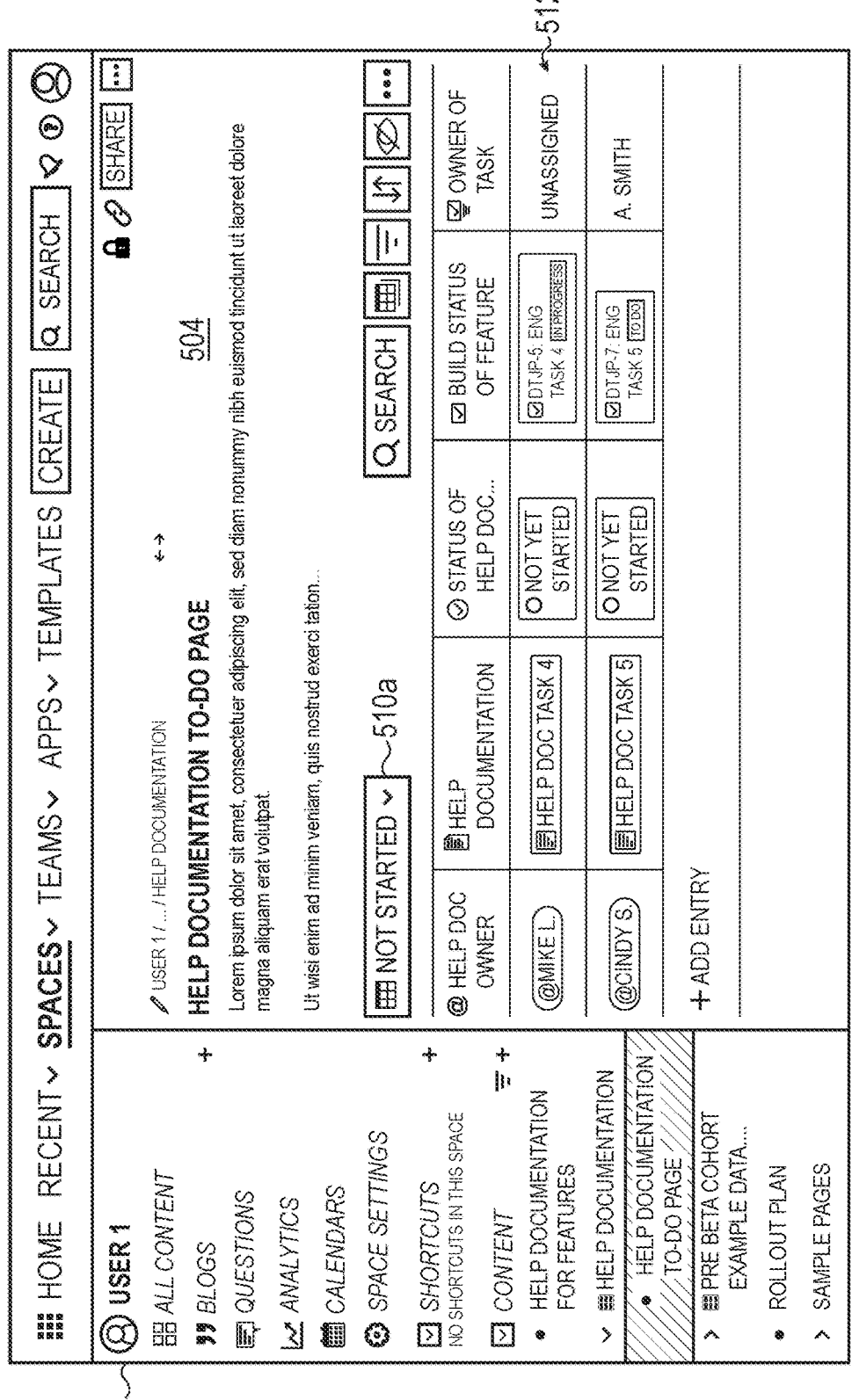
Figure 5D:
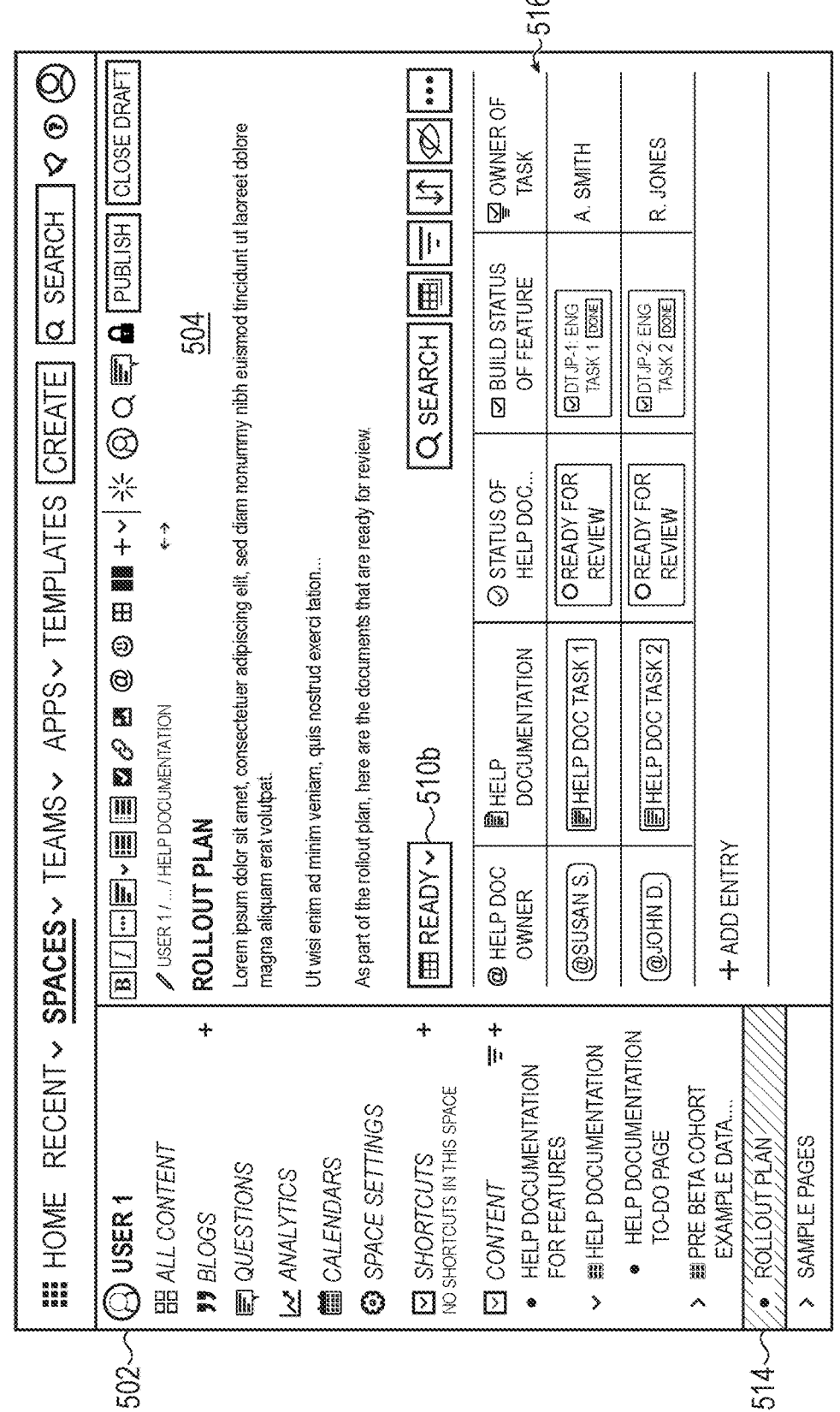

FIG. 5C shows an example view of a filtered dynamic object table 512. As depicted, the filtered dynamic object table 512 shows only the filtered entries according to the saved view option 510a. While this view is shown in this page, the underlying dynamic object table embedded in the page is not altered by the page view. Accordingly, other users can use the dynamic object table in its full state without changing the view of pages where the dynamic object table is embedded. An example of this is depicted in FIG. 5D. As shown in FIG. 5D, a user may navigate to a different page, such as page 514 ROLLOUT PLAN. In this example, the page 514 may also include the dynamic object table from FIG. 5A except that a different filtering criteria has been applied. Accordingly, the second filtered dynamic object table 516 applies a READY FOR REVIEW criteria (saved in READY view 510b) and thus only items that satisfy the criteria are displayed. When a user toggles between the pages of FIGS. 5C and 5D, the different views with the different filtering criteria are preserved in their respective pages.

Figure 6:
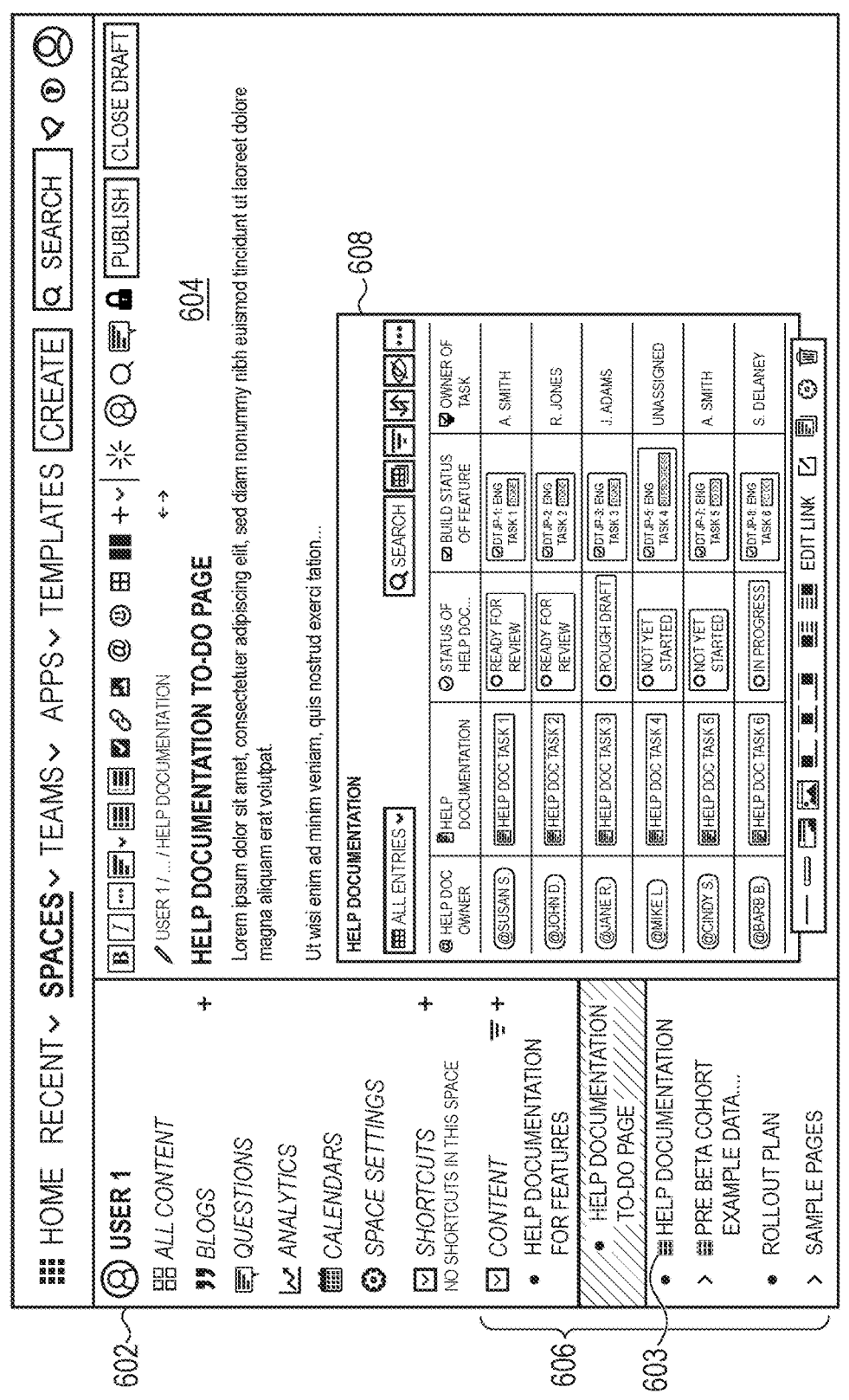
FIG. 6 depicts an example graphical user interface of a page of the content collaboration platform that includes a dynamic object table, such as described herein.

FIG. 6 shows an example graphical user interface 600 of a content collaboration platform. In this graphical user interface, the page HELP DOCUMENT TO-DO PAGE is a parent element without a hierarchical relationship with respect to the underlying dynamic object table element 603 within a page tree 606 of the navigational panel 602. More specifically, the pages with embedded dynamic object tables may be in different spaces from the underlying dynamic object table and/or in the space without direct parent/child relationship with respect to the table. For example, as depicted, in some examples, a dynamic object table 608 may be embedded and displayed within the content panel 604 of a page regardless of its hierarchical relationship with element 603. This configuration allows users to freely configure a space, pages, and the element tree without affecting the automatic population of the dynamic object table. As configured, in some embodiments, changes of a hierarchical relationship of a page does not alter the link in the dynamic object table. For example, if a user moves "HELP DOC TASK 1" from its current location within the page tree, the dynamic object table is configured to remain linked to the page regardless of its new location.

Figure 7:
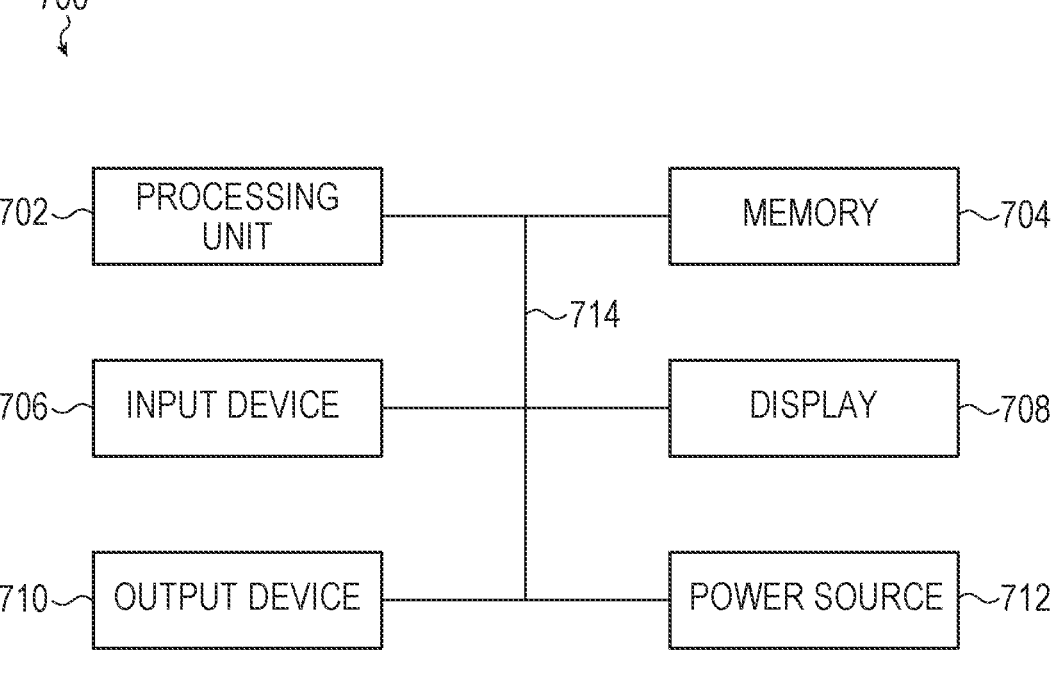
FIG. 7 depicts example hardware for devices of the systems described herein.

FIG. 7 shows a sample electrical block diagram of an electronic device 700 that may perform the operations described herein. The electronic device 700 may in some cases take the form of any electronic device, including client devices, and/or servers, or other computing devices associated with the system 100 from FIG. 1. The electronic device 700 can include one or more of a processing unit 702, a memory 704 or storage device, input devices 706, a display 708, output devices 710, and a power source 712. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit, and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally, or alternatively, the power source 712 can be a power connector or power cord that connects the electronic device 700 to another power source, such as a wall outlet.

The memory 704 can store electronic data that can be used by the electronic device 700. For example, the memory 704 can store electronic data or content such as, for instance, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example, associated with an operating system, user interface, and/or applications of the electronic device 700 (e.g., a chat user interface, an issue-tracking user interface, an issue-discovery user interface, etc.). In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more types of input and provide a signal (e.g., an input signal) corresponding to the detected input. The signal may be provided, for example, to the processing unit 702.

As discussed above, in some cases, the input device(s) 706 may include a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710 to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes, at a minimum, one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database. Whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

It may be further appreciated that a request-response RESTful system implemented in whole or in part over cloud infrastructure is merely one example architecture of a system as described herein. More broadly, a system as described herein can include a frontend and a backend configured to communicably couple and to cooperate in order to execute one or more operations or functions as described herein. In particular, a frontend may be an instance of software executing by cooperation of a processor and memory of a client device. Similarly, a backend may be an instance of software and/or a collection of instantiated software services (e.g., microservices) each executing by cooperation of a processor resource and memory resources allocated to each respective software service or software instance. Backend software instances can be configured to expose one or more endpoints that frontend software instances can be configured to leverage to exchange structured data with the backend instances. The backend instances can be instantiated over first-party or third-party infrastructure, which can include one or more physical processors and physical memory devices. The physical resources can cooperate to abstract one or more virtual processing and/or memory resources that in turn can be used to instantiate the backend instances.

The backend and the frontend software instances can communicate over any suitable communication protocol or set of protocols to exchange structured data. The frontend can, in some cases, include a graphical user interface rendered on a display of a client device, such as a laptop computer, desktop computer, or personal phone. In some cases, the frontend may be a browser application and the graphical user interface may be rendered by a browser engine thereof in response to receiving HTML served from the backend instance or a microservice thereof.

What is claimed is:

1. A method for creating a dynamic object table in a content collaboration platform, the method comprising:

causing display of a graphical user interface of the content collaboration platform, the graphical user interface comprising:

a content panel configured to display content from a page or from a dynamic object table;

a navigational panel comprising a set of hierarchically arranged elements, each element selectable to display the page or the dynamic object table in the content panel; and receiving, at the navigational panel of the graphical user interface, a first user input to create a new element in the set of hierarchically arranged elements;

in response to the first user input, causing display of the dynamic object table in the content panel;

receiving, within a first column of the dynamic object table, a second input, the second input corresponding to selection of a source content item;

in response to receiving the second input, inserting, within a first cell of the first column, a graphical object corresponding to the source content item, the graphical object selectable to cause redirection to the source content item on a hosting platform;

receiving, within a second column of the dynamic object table, a third input comprising a selection of a particular attribute category from a set of attribute categories;

in accordance with a user selecting the particular attribute category, automatically populating content obtained from the source content item that corresponds to the particular attribute category in a second cell of the second column, in line with the first cell; and causing display, within the navigational panel, of the new element corresponding to the dynamic object table.

2. The method of claim 1, further comprising:

in response to a user selection of a first element of the set of hierarchically arranged elements, causing display of content of a first page within the content panel;

in an edit mode of the first page, receiving, within the content panel, a link to the dynamic object table;

in response to receiving the link, rendering the dynamic object table as an embedded object within the content of the first page;

receiving, within the first page, a fourth user input comprising an editing input of a particular cell of the dynamic object table;

in response to the fourth user input, causing the content of the particular cell to change within the dynamic object table; and updating display of the dynamic object table within the first page in accordance with the editing input.

3. The method of claim 1, further comprising:

receiving, within a third column of the dynamic object table, a fourth input, the fourth input comprising a selection of an external item from a set of external items of an external platform;

in response to receiving the fourth input, inserting, within a third cell of the third column, a graphical object corresponding to the external item;

receiving, within a fourth column of the dynamic object table, a fifth input comprising a selection of a particular field category from a set of field categories; and in accordance with the user selecting the particular field category, populating content from the external item that corresponds to the particular field category in a fourth cell of the fourth column in line with the third cell.

4. The method of claim 3, wherein the external platform is an issue tracking platform and the external item corresponds to an issue item managed by the issue tracking platform.

5. The method of claim 1, further comprising:

receiving a fourth input from the user within the second cell of the second column, the fourth input comprising an edit input of the content;

in response to the fourth input:

within a particular page corresponding to the source content item of the first cell, causing the particular attribute category to change in accordance with the edit input; and causing display of updated content in the second cell in accordance with the change to the particular attribute category of the particular page.

6. The method of claim 1, further comprising:

determining that a change in content corresponding to the particular attribute category has occurred; and in accordance with the determination, automatically updating the content of the second cell in accordance with an updated content.

7. The method of claim 1, wherein:

the hosting platform is a an external platform that external to the content collaboration platform; and causing redirection to the source content item includes causing display of the source content item on a client application of the external platform.

8. A method for viewing a dynamic object table in a page of a content collaboration platform, the method comprising:

causing display of a graphical user interface of the content collaboration platform, the graphical user interface comprising:

a content panel configured to display content from the page or from the dynamic object table and comprising a filter menu selectable user interface object;

a navigational panel comprising a set of hierarchically arranged elements; and causing display, within the content panel, of a first page, the first page comprising a first embedded object corresponding to the dynamic object table, the dynamic object table comprising a set of rows and columns having linked content items and associated attributes automatically extracted from the linked content items; and within the content panel and while displaying content of the first page:

in response to receiving a first indication of a first input corresponding to selection of the filter menu selectable user interface object, causing display of a filter sub-menu comprising a plurality of filter criteria including a first filter criteria and a second filter criteria;

in response to receiving a second indication of a second input corresponding to selection of the first filter criteria, updating display of the first embedded object to a first view, the first view in accordance with the first filter criteria, the first view comprising a first subset of rows and columns less than the set of rows and columns of the dynamic object table; and causing display, within the content panel, of content of a second page, the content of the second page comprising a second embedded object corresponding to the dynamic object table; and within the content panel of the second page:

in response to receiving a third indication of a third input corresponding to selection of the filter menu selectable user interface object, causing display of the filter sub-menu comprising the plurality of filter criteria including the first filter criteria and the second filter criteria; and in response to receiving a fourth indication of a fourth input corresponding to selection of the second filter criteria, updating display of the second embedded object to a second view in accordance with the second filter criteria, the second view comprising a second subset of rows and columns different from the first subset of rows and columns and less than the set of rows and columns of the dynamic object table, each of the first and second views coexisting independently in their respective pages.

9. The method of claim 8, wherein the filter sub-menu further comprises a third filter criteria corresponding to an option to apply at least one of the first filter criteria or the second filter criteria to at least one of the columns.

10. The method of claim 8, wherein the filter sub-menu further comprises a user-added filter criteria.

11. The method of claim 8, further comprising:

causing display, within a client device of another user, of the first page, the display of the first page including the dynamic object table filtered according to the first view.

12. The method of claim 8, further comprising:

in response to a change to a linked object, receiving updated data corresponding to a cell of the dynamic object table;

determining that the updated data fails the first filter criteria; and in response to the updated data failing the first filter criteria, removing a row associated with the cell from the first view.

13. The method of claim 8, wherein:

the dynamic object table within the first page comprises a view menu selectable to toggle between the first view and an unfiltered view.

14. The method of claim 13, wherein:

a set of views available in the view menu are unique to the first page.

15. A method for creating a dynamic object table in a content collaboration platform, the dynamic object table having linked native and non-native content, the method comprising:

causing display of a graphical user interface of the content collaboration platform, the graphical user interface comprising:

a content panel configured to display content from a page or from the dynamic object table;

a navigational panel comprising a set of hierarchically arranged elements corresponding to pages and dynamic object tables, each element selectable to display a respective page or a respective dynamic object table in the content panel; and in response to a user input, causing display of the dynamic object table within the content panel;

receiving, at a first column of the dynamic object table, a path to a first object; and in response to the first object being a native object:

retrieving a set of attributes from the native object;

determining that a second column designates a first attribute from the set of attributes and is linked to the first object;

automatically populating the first attribute within the second column; and receiving, at a third column, a path to an issue item from an issue tracking platform, the issue tracking platform different from the content collaboration platform; and based on the issue item being a non-native object:

authenticating user access to the issue tracking platform based on the determination that the issue tracking platform is a registered platform;

receiving, within a fourth column, a field selection corresponding to a first field of the issue item;

retrieving data from the first field; and causing display of the data from the first field within the fourth column.

16. The method of claim 15, further comprising:

in response to a user selecting an element within the navigational panel, causing display of a particular page in the content panel;

receiving, within the content panel, an embed request comprising a link to the dynamic object table;

inserting, within a content region of the particular page, the dynamic object table; and in response to an edit input in a cell within the dynamic object table:

determining whether the cell includes a native object or a non-native object; and in response to the cell including the native object, updating within a source content corresponding to the native object in accordance with the edit input.

17. The method of claim 16, further comprising:

in response to the cell including the non-native object, suppressing the edit input from the user.

18. The method of claim 16, further comprising:

receiving, within the content region of the particular page, a filter input from the dynamic object table; and causing update of the dynamic object table in accordance with the filter input.

19. The method of claim 18, further comprising:

in accordance with another user accessing the particular page, causing display of the dynamic object table filtered according to the filter input.

20. The method of claim 15, further comprising:

receiving, within the second column, a request to designate a second attribute from the set of attributes different from the first attribute;

deleting, from the second column, data corresponding to the first attribute; and automatically populating cells of the second column in accordance with the second attribute.

\* \* \* \* \*